United States Patent
Eyer et al.

(10) Patent No.: US 6,789,106 B2
(45) Date of Patent: Sep. 7, 2004

(54) SELECTIVE CAPTURE AND STORAGE OF A/V OBJECTS IN AN INTERACTIVE MULTIMEDIA SYSTEM

(75) Inventors: Mark Kenneth Eyer, San Diego, CA (US); Aditya Krishnan, San Diego, CA (US); Fred J. Zustak, Poway, CA (US); Matthew S. Chang, San Diego, CA (US); Andrew M. Proehl, San Francisco, CA (US); Brant L. Candelore, Escondido, CA (US); Nicholas Colsey, Del Mar, CA (US); David K. L. Yang, San Jose, CA (US); Dayan Ivy Golden, San Diego, CA (US); Peter Rae Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 804 days.

(21) Appl. No.: 09/775,971

(22) Filed: Feb. 2, 2001

(65) Prior Publication Data

US 2002/0107909 A1 Aug. 8, 2002

(51) Int. Cl.[7] .............................................. G06F 15/16
(52) U.S. Cl. ........................... 709/205; 725/87; 725/89; 725/86; 725/100; 725/101; 725/104; 725/88; 725/102
(58) Field of Search ................................ 725/100, 101, 725/102, 104, 88, 87, 89, 86; 709/205

(56) References Cited

U.S. PATENT DOCUMENTS

| 6,381,747 B1 | * | 4/2002 | Wonfor et al. | ............... 725/104 |
| 2003/0020744 A1 | * | 1/2003 | Ellis et al. | .................. 345/723 |

* cited by examiner

*Primary Examiner*—John Follansbee
*Assistant Examiner*—Ashok Patel
(74) *Attorney, Agent, or Firm*—Miller Patent Services; Jerry A. Miller (57) ABSTRACT

A method and structure that allows a user who has access to an audio/visual object to cause an interactive control element of an interactive multimedia system to grab and store off for future retrieval the audio/visual object by simply activating a selection mechanism of the interactive multimedia system.

26 Claims, 3 Drawing Sheets

SELECTIVE CAPTURE AND STORAGE OF A/V OBJECTS IN AN INTERACTIVE MULTIMEDIA SYSTEM

FIELD OF THE INVENTION

This invention relates generally to multimedia networks and processing systems, and more particularly to the manipulation of audio/visual objects delivered by such multimedia networks and processing systems.

BACKGROUND OF THE INVENTION

The user of an interactive multimedia system, whether a viewer of a movie or video or a listener of music, is presented with more and more audio/visual choices. These audio/visual choices can take the form of commercials, musical selections heard within movies, music video, movie trailers, movies, etc. With the rise of electronic commerce and the development of broadcast and satellite television programming that targets users having certain interests, there is a great opportunity for the content provider of such audio/visual programs to sell their programming to a highly motivated recipient. What is needed in the art, then, is the ability for a user of the interactive multimedia system to be able to readily purchase, or view for possible purchase, one or more of the audio/visual choices. In order to encourage the sale of audio/visual programs, it would be especially advantageous for the selection of desired audio/visual choices to be quick, easy, and as close in time to the actual viewing or listening of the audio/visual program as possible.

SUMMARY OF THE INVENTION

Certain embodiments of the invention enable a user of an interactive multimedia system, when presented with myriad audio/visual programming, to quickly, easily, and readily choose one or more of the audio/visual programs for viewing and possible purchase.

Therefore, in accordance with certain embodiments of the present invention, a method and system provides for the capture and storage of audio/visual objects of interest, which can be retrieved and perused at some future time by the user of the system. An interactive multimedia system has an interactive control element that controls the receipt, play and storage of audio/visual information (objects); a content provider operable to send a plurality of audio/visual objects to the interactive control element; a selection mechanism coupled to the interactive control element and under the control of the user of the interactive multimedia system; a temporary storage element that is controlled by the interactive control element to store each audio/visual object as it is played; and a long-term storage element.

The interactive control element of the interactive multimedia system receives a plurality of audio/visual objects for play from the content provider and causes each such object to be stored to a temporary storage element as it is played. In response to the user activating the selection mechanism of the interactive multimedia system, it is determined whether the interactive control element has completed storing an audio/visual object to the temporary storage element that the user has selected via the selection mechanism. If the interactive control element has completed storing the selected audio/visual object to the temporary storage element, the selected audio/visual object is transferred from the temporary storage element to a long-term storage element. If, however, the interactive control element has not completed storing the selected audio/visual object to the temporary storage element, it is determined whether selected audio/visual object to currently being played. If it is not currently being played, this means that the selected object may not be available locally and the interactive control element retrieves the selected audio/visual object from the content provider (if necessary) and stores it in the long-term storage element. If the selected audio/visual object is being currently played, then the interactive control element continues to store the selected audio/visual object within the temporary storage element until the selected audio/visual object is stored in its entirety (has finished playing) and then transfers it from the temporary storage element to the long-term storage element, where it can be retrieved at some later time when desired.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention provides a method and structure that allows a user who has access to an audio/visual object to selectively, and with great ease, "grab" that audio/visual object as desired. According to a preferred embodiment of the invention, the audio/visual object grabbed is most likely to be the current audio/visual object being received or the most recent audio/visual object received, although it is envisioned that the user may select other objects for selection, such as through the use of a GUI. An audio/visual object has content that may be of interest to the viewer and may be thought of as having both audio and visual components, or it may just have only an audio component (such as music) or a video component (such as a video clip without accompanying audio); the term "audio/visual object" is thus meant to cover an audio selection, a video selection, and an audio/video selection. Examples of such audio/visual objects suitable for capture, storage, and potential retrieval using the present invention include music videos, commercial advertisements, musical selections heard within movies, movies, movie trailers, an event premium, an electronic commercial transaction (like impulse pay-per-view), and any other type of audio/visual or simply audio object in which a user, whether a viewer or a listener, is interested.

In accordance with the present invention, the user communicates a desire to grab a particular audio/visual object through appropriate interaction with an interactive control element within an interactive cable or satellite television (TV) system. In an exemplary embodiment of the invention, the interactive control element is a set-top box within the interactive cable or satellite television (TV) system. As will be described, it is also envisioned that the functionality of the interactive control element may be satisfied by placing the set-top box functionality within the television 24 or as part of a computer having a tuner device and modem that encompasses the functionality of the television 24 and set-top box 22.

Figure 1:
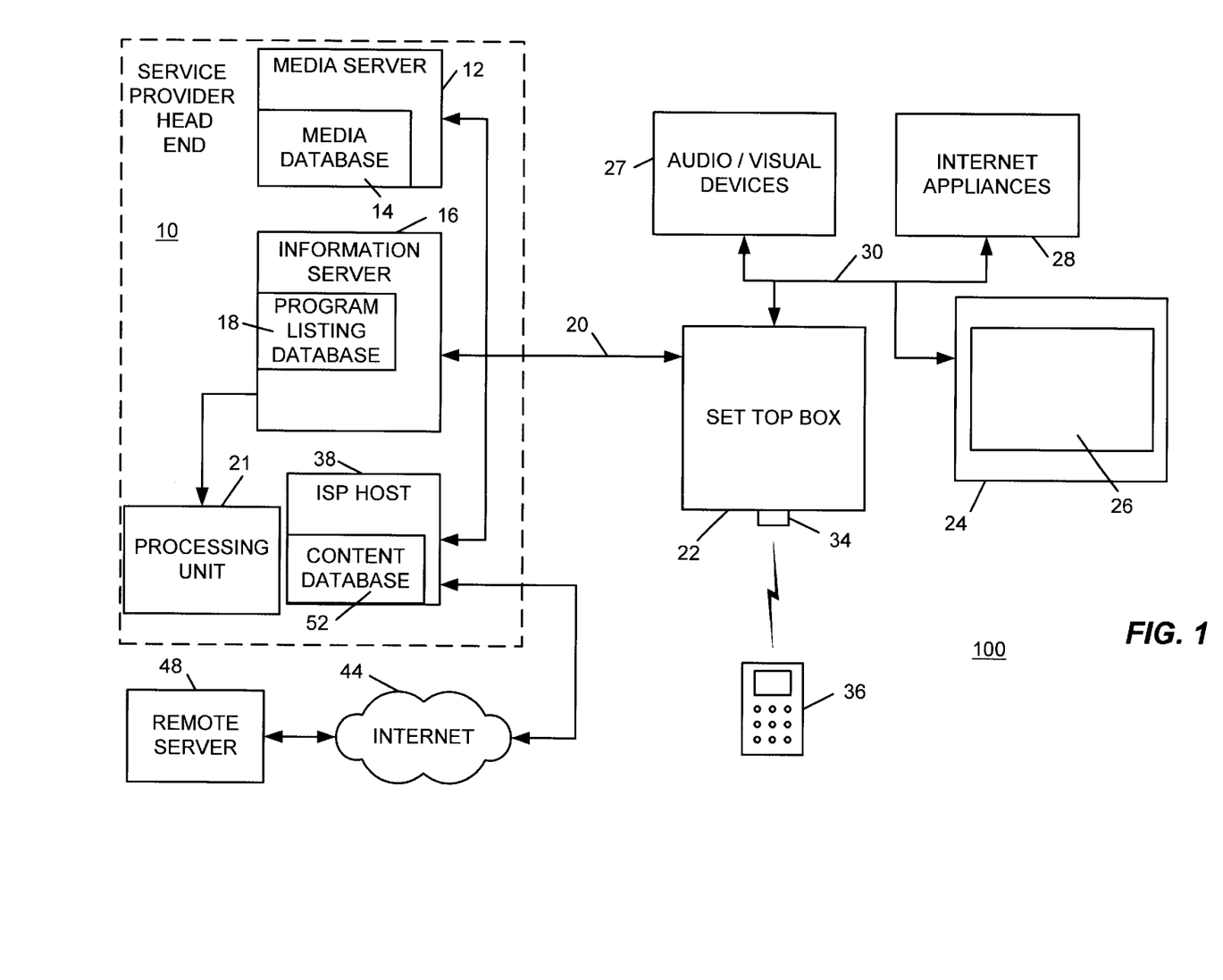
FIG. 1 is a block diagram of an exemplary interactive multimedia system, in accordance with the present invention.

Referring now to FIG. 1, a block diagram for the exemplary interactive cable or satellite television (TV) system 100 of the present invention is shown. The system 100 includes, at a head end of the service provider 10, a media server 12 for providing, on demand, movies and other programming obtained from a media database 14. Service provider 10 may be thought of as a content provider insofar as it delivers content to the set-top box 22. The media server 12 might also provide additional content such as interviews with the actors, games, advertisements, available merchandise, associated Web pages, interactive games and other related content. The system 100 also includes an information server 16 and a program listing database 18. The program listing database 18 may contain a list of scheduled broadcast programs and programs available on-demand. The program listing database 18 of information server 16 of service provider 10 conveys a number of information attributes about an audio or audio/visual object to the set-top box 22 that allow for the audio/visual object to be grabbed upon demand by the user and stored in memory for later retrieval as desired. These audio/visual information attributes may include, by way of example and not limitation, one or more of the following: an identifier of the object such as the name of the object (music or advertisement) selected or the name of a collection containing the object selected (such as, for instance, when a song is part of an album), the name of author of the selection such as the artist of a song or album, a schedule attribute including the precise start time and duration of the object (contained within the schedule information provided by program listing database 18), the location of the selected audio/visual object, copy and access control information such as the cost of the object and the maximum number of legal copies that can be made.

Selection information, such as timing information about the start and end points of an audio/visual object, can be included in the transport stream (TS) received by the set-top box from the service provider head end 10. For instance, attribute information needed to select the object can be included in a MPEG-2 Transport Stream in the form of MPEG-2 table sections; the reader is referred to, for example, the EIA/CEA-775.2 Service selection information for digital storage media interoperability standard. The timing information contained in the TS from the service provider 10 may be used to mark the boundary points, or splice points, such as the file start and end points, of the audio/visual object. If the user indicates that the object is to be "grabbed," the boundary marks are used to ensure that the first saved sample corresponds to the first moment of the object and that the last sample corresponds to the last moment of the object. Copy and access control information reflects the intent of the content owner of a certain audio/visual object about whether, when, or how often the object is available for selection and copying by the user; some objects may in fact be "ungrabbable," in which case the user of the audio/visual object will not be allowed to grab or capture it and store it off for later use.

Set-top box 22 can generally provide for bi-directional communication over a transmission medium 20 in the case of a cable STB 22. In other embodiments, bi-directional communication can be effected using asymmetrical communication techniques possibly using dual communication media—one for the uplink and one for the downlink. In any event, the STB 22 can have its own Universal Resource Locator (URL) or IP address or other unique identifier assigned thereto to provide for addressability by the head end and users of the Internet.

The media server 12 and information server 16 are operatively coupled by transmission medium 20 to a set-top box (STB) 22. The transmission medium 20 may include, for example, a conventional coaxial cable network, a fiber optic cable network, telephone system, twisted pair, a satellite communication system, a radio frequency (RF) system, a microwave system, other wireless systems, a combination of wired and wireless systems or any of a variety of known electronic transmission media. In the case of a cable television network, transmission medium 20 is commonly realized at the subscriber's premises as a coaxial cable that is connected to a suitable cable connector at the rear panel of the STB 22. In the case of a Direct Satellite System (DSS), the STB 22 is often referred to as an Integrated Receiver Decoder (IRD). In the case of a DSS system, the transmission medium is a satellite transmission at an appropriate microwave band. Such transmissions are typically received by a satellite dish antenna with an integral Low Noise Block (LNB) that serves as a down-converter to convert the signal to a lower frequency for processing by the STB 22.

The exemplary system 100 further includes a TV 24, such as a digital television, having a display 26 for displaying programming, web pages, etc. The STB 22 may be coupled to the TV 24 and various other audio/visual devices 27 (such as audio systems, Personal Video Recorders (PVRs), Video Tape Recorders (VTRs), Video Cassette Recorders (VCRs) and the like), storage devices (e.g., hard disc drives) and Internet Appliances 28 (such as email devices, home appliances, storage devices, network devices, and other Internet Enabled Appliances) by an appropriate interface 30, which can be any suitable analog or digital interface. In one embodiment, interface 30 conforms to an interface standard such as the Institute of Electrical and Electronics Engineers (IEEE) 1394 standard, but could also be wholly or partially supported by a DVI interface (Digital Visual Interface—Digital Display Working Group, www.ddwg.org) or other suitable interface.

The STB 22 may include a central processing unit (CPU) such as a microprocessor and memory such as Random Access Memory (RAM), Read Only Memory (ROM), flash memory, mass storage such as a hard disc drive, floppy disc drive, optical disc drive or may accommodate other electronic storage media, etc. Such memory and storage media is suitable for storing data as well as instructions for programmed processes for execution on the CPU, as will be discussed later. Information and programs stored on the electronic storage media or memory may also be transported over any suitable transmission medium such as that illustrated as 20. STB 22 may include circuitry suitable for audio decoding and processing, the decoding of video data compressed in accordance with a compression standard such as the Motion Pictures Experts Group (MPEG) standard and other processing to form a controller or central hub. Alternatively, components of the STB 22 may be incorporated into the TV 24 itself, thus eliminating the STB 22. Further, a computer having a tuner device and modem may be equivalently substituted for the TV 24 and STB 22.

By way of example, the STB 22 may be coupled to devices such as a personal computer, video cassette recorder, camcorder, digital camera, personal digital assistant and other audio/visual or Internet related devices. In addition, a data transport architecture may be utilized to enable interoperability among devices on a network regardless of the manufacturer of the device if the manufacturers agree to adhere to an industry standard. The STB 22 runs an operating system suitable for a home network system.

The STB 22 includes an infrared (IR) receiver 34 for receiving IR signals from an input device such as remote control 36. Alternatively, it is noted that many other control communication methods may be utilized besides IR, such as wired or wireless radio frequency, etc. In addition, it can be readily appreciated that the input device 36 may be any device suitable for controlling the STB 22 such as a remote control, personal digital assistant, laptop computer, keyboard or computer mouse. In addition, an input device in the form of a control panel located on the TV 24 or the STB 22 can be provided.

The STB 22 may also be coupled to an independent service provider (ISP) host 38 by a suitable connection including dial-up connections, DSL (Digital Subscriber Line) or the same transmission medium 20 described above (e.g., using a cable modem) to, thus, provide access to services and content from the ISP and the Internet. The ISP host 38 provides various content to the user that is obtained from a content database 52. STB 22 may also be used as an Internet access device to obtain information and content from remote servers such as remote server 48 via the Internet 44 using host 38 operating as an Internet portal, for example. In certain satellite STB environments, the data can be downloaded at very high speed from a satellite link, with asymmetrical upload speed from the set-top box provided via a dialup or DSL connection.

While the arrangement illustrated in FIG. 1 shows a plurality of servers and databases depicted as independent devices, any one or more of the servers can operate as server software residing on a single computer. Moreover, although not explicitly illustrated, the servers may operate in a coordinated manner under centralized or distributed control to provide multiple services as a Multiple Service Operator (MSO) in a known manner. Additionally, the services provided by the servers shown in FIG. 1 may actually reside in other locations, but from the perspective of the user of STB 22, the service provider 10 serves as a portal to the services shown. Those skilled in the art will appreciate that the illustration of FIG. 1 represents a simplified depiction of a cable system configuration shown simply as service provider 10. The simplified illustration shown is intended to simplify the discussion of the service provider 10's operation without unnecessarily burdening the discussion with architectural details that will be evident to those skilled in the art.

Figure 2:
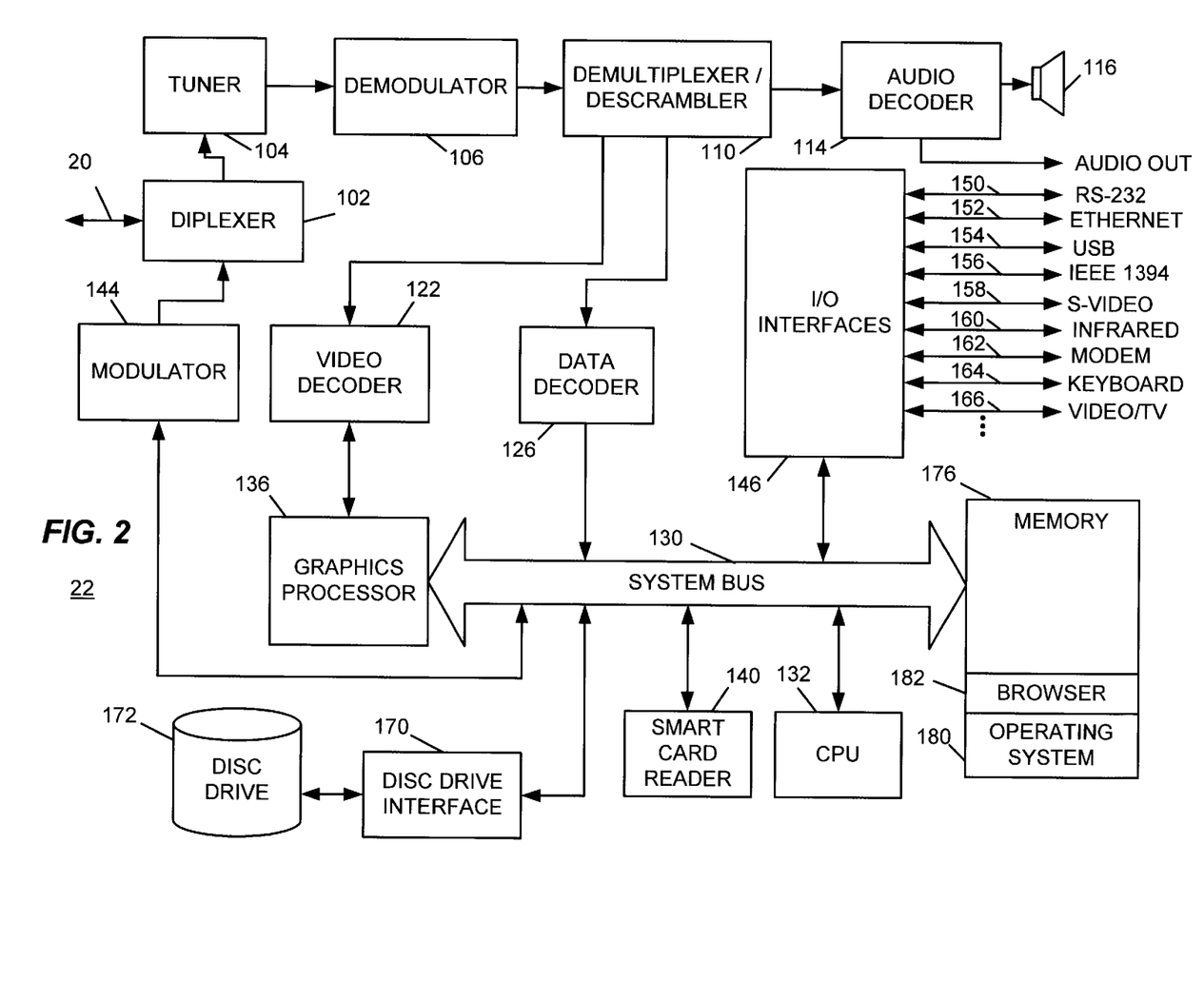
FIG. 2 is a system configuration for a digital set-top box suitable for use in the present invention.

As previously mentioned, the interactive control element in an exemplary embodiment of the present invention is a set-top box within the interactive cable or satellite television (TV) system just described in FIG. 1. Referring now to FIG. 2, a typical system configuration for such a digital set-top box 22 is illustrated. In this exemplary set-top box, the transmission medium 20, such as a coaxial cable, is coupled by a suitable interface through a diplexer 102 to a tuner 104. Tuner 104 may, for example, include a broadcast in-band tuner for receiving content, an out-of-band (OOB) tuner for receiving data transmissions. A return path through diplexer 102 provides an OOB return path for outbound data (destined for example for the head end). A separate tuner (not shown) may be provided to receive conventional RF broadcast television channels. Modulated information formatted, for example, as MPEG-2 information is then demodulated at a demodulator 106. The demodulated information at the output of demodulator 106 is provided to a demultiplexer and descrambler circuit 110 where the information is separated into discrete channels of programming. The programming is divided into packets, each packet bearing an identifier called a Packet ID (PID) that identifies the packet as containing a particular type of data (e.g., audio, video, data). The demodulator and descrambler circuit 110 also descrambles scrambled information in accordance with a decryption algorithm to prevent unauthorized access to programming content, for example.

Audio packets from the demultiplexer 110 (those identified with an audio PID) are decrypted and forwarded to an audio decoder 114 where they may be converted to analog audio to drive a speaker system (e.g., stereo or home theater multiple channel audio systems) or other audio system 116 (e.g., stereo or home theater multiple channel amplifier and speaker systems) or may simply provide decoded audio out at 118. Video packets from the demultiplexer 110 (those identified with a video PID) are decrypted and forwarded to a video decoder 122. In a similar manner, data packets from the demultiplexer 110 (those identified with a data PID) are decrypted and forwarded to a data decoder 126.

Decoded data packets from data decoder 126 are sent to the set-top box's computer system via the system bus 130. A central processing unit (CPU) 132 can thus access the decoded data from data decoder 126 via the system bus 130. Video data decoded by video decoder 122 is passed to a graphics processor 136, which is a computer optimized to processes graphics information rapidly. Graphics processor 136 is particularly useful in processing graphics intensive data associated with Internet browsing, gaming and multimedia applications. It should be noted, however, that the function of graphics processor 136 may be unnecessary in some set-top box designs having lower capabilities, and the function of the graphics processor 136 may be handled by the CPU 132 in some applications where the decoded video is passed directly from the demultiplexer 110 to a video encoder. Graphics processor 136 is also coupled to the system bus 130 and operates under the control of CPU 132.

Many set-top boxes such as STB 22 may incorporate a smart card reader 140 for communicating with a so called "smart card," often serving as a Conditional Access Module (CAM). The CAM typically includes a central processor unit (CPU) of its own along with associated RAM and ROM memory. Smart card reader 140 is used to couple the system bus of STB 22 to the smart card serving as a CAM (not shown). Such smart card based CAMs are conventionally utilized for authentication of the user and authentication of transactions carried out by the user as well as authorization of services and storage of authorized cryptography keys. For example, the CAM can be used to provide the key for decoding incoming cryptographic data for content that the CAM determines the user is authorized to receive.

STB 22 can operate in a bi-directional communication mode so that data and other information can be transmitted not only from the system's head end to the end user, or from a service provider to the end user of the STB 22, but also, from the end user upstream using an out-of-band channel. In one embodiment, such data passes through the system bus 130 to a modulator 144 through the diplexer 102 and out through the transmission medium 20. This capability is used to provide a mechanism for the STB 22 and/or its user to send information to the head end (e.g., service requests or changes, registration information, etc.) as well as to provide fast outbound communication with the Internet or other services provided at the head end to the end user.

Set-top box 22 may include any of a plurality of I/O (Input/Output) interfaces represented by I/O interfaces 146 that permit interconnection of I/O devices to the set-top box 22. By way of example, and not limitation, a serial RS-232 port 150 can be provided to enable interconnection to any suitable serial device supported by the STB 22's internal software. Similarly, communication with appropriately compatible devices can be provided via an Ethernet port 152, a USB (Universal Serial Bus) port 154, an IEEE 1394 (so-called firewire™ or i-LINK™) or IEEE 1394 port 156, S-video port 158 or infrared port 160. Such interfaces can be utilized to interconnect the STB 22 with any of a variety of accessory devices such as storage devices, audio/visual devices 26, gaming devices (not shown), Internet Appliances 28, etc.

I/O interfaces 146 can include a modem (be it dial-up, cable, DSL or other technology modem) having a modem port 162 to facilitate high speed or alternative access to the Internet or other data communication functions. In one preferred embodiment, modem port 162 is that of a DOCSIS (Data Over Cable System Interface Specification) cable modem to facilitate high speed network access over a cable system, and port 162 is appropriately coupled to the transmission medium 20 embodied as a coaxial cable. Thus, the STB 22 can carry out bi-directional communication via the DOCSIS cable modem with the STB 22 being identified by a unique IP address. The DOCSIS specification is publicly available. Of course, it is envisioned that the modem can be part of the set-top box.

A PS/2 or other keyboard/mouse/joystick interface such as 164 can be provided to permit ease of data entry to the STB 22. Such inputs provide the user with the ability to easily enter data and/or navigate using pointing devices. Pointing devices such as a mouse or joystick may be used in gaming applications.

Of course, STB 22 also may incorporate basic video outputs 166 that can be used for direct connection to a television set such as 24 instead of (or in addition to) an IEEE 1394 connection such as that illustrated as 30. In one embodiment, Video output 166 can provide composite video formatted as NTSC (National Television System Committee) video.

The infrared port 160 can be embodied as an infrared receiver 34 as illustrated in FIG. 1, to receive commands from an infrared remote control 36, infrared keyboard or other infrared control device. Although not explicitly shown, front panel controls may be used in some embodiments to directly control the operation of the STB 22 through a front panel control interface as one of interfaces 146. Selected interfaces such as those described above and others can be provided in STB 22 in various combinations as required or desired.

STB 22 will more commonly, as time goes on, include a disc drive interface 170 and disc drive mass storage 172 for user storage of content and data as well as providing storage of programs operating on CPU 132. STB 22 may also include floppy disc drives, CD ROM drives, CD RAN drives, DVD drives, etc. CPU 132, in order to operate as a computer, is coupled through the system bus 130 (or through a multiple bus architecture) to memory 176. Memory 178 may include a combination any suitable memory technology including Random Access Memory (RAM), Read Only Memory (ROM), Flash memory, Electrically Erasable Programmable Read Only Memory (EEPROM), etc.

While the above exemplary system including STB 22 is illustrative of the basic components of a digital set-top box suitable for use with the present invention, the architecture shown should not be considered limiting since many variations of the hardware configuration are possible without departing from the present invention. The present invention could, for example, also be implemented in more advanced architectures such as that disclosed in U.S. patent application Ser. No. 09/473,625, filed Dec. 29, 1999, Docket No. SONY-50N3508 entitled "Improved Internet Set-Top Box Having and In-Band Tuner and Cable Modem" to Jun Maruo and Atsushi Kagami. This application describes a set-top box using a multiple bus architecture with a high level of encryption between components for added security and a separate video path. This application is hereby incorporated by reference as though disclosed fully herein.

In general, during operation of the STB 22, an appropriate operating system 180 is loaded into, or is permanently stored in, active memory along with the appropriate drivers for communication with the various interfaces. In other embodiments, other operating systems such as Microsoft Corporation's Windows CE™ could be used without departing from the present invention. Along with the operating system and associated drivers, the STB 22 usually operates using browser software 182 in active memory or may permanently reside in ROM, EEPROM or Flash memory, for example. The browser software 182 typically operates as the mechanism for viewing not only web pages on the Internet, but also serves as the mechanism for viewing an Electronic Program Guide (EPG) formatted as an HTML document.

STB software architectures vary depending upon the operating system. However, in general, all such architectures generally include, at the lowest layer, various hardware interface layers. Next is an operating system layer as previously described. The software architectures of modern STB have generally evolved to include a next layer referred to as "middleware." Such middleware permits applications to run on multiple platforms with little regard for the actual operating system in place. Middleware standards are still evolving at this writing, but are commonly based upon Javascript and HTML (hypertext Markup Language) virtual machines. At the top layer is the application layer where user applications and the like reside, e.g., browsing, email, EPG, Video On Demand (VOD), rich multimedia applications, pay per view, etc. The current invention can be utilized with any suitable set-top box software and hardware architecture.

Figure 3:
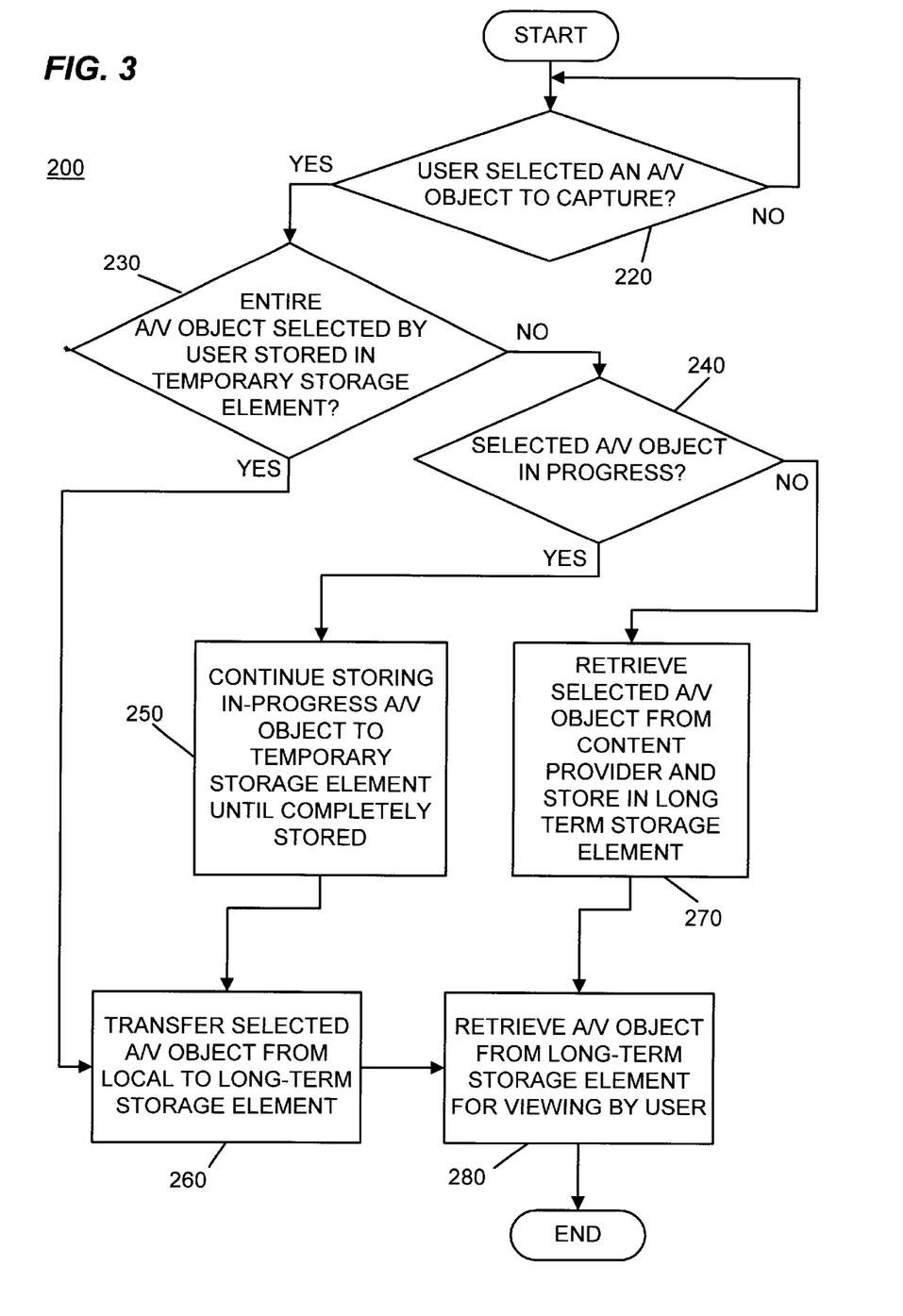
FIG. 3 presents a flow chart illustrative of the methodology of the present invention.

The methodology of the present invention that provides for a selected audio/visual object, assuming that it is available, to be "grabbed," or captured, and then stored off for possible future retrieval is demonstrated in the flow 200 of FIG. 3. Each audio/visual object is provided by service provider 10 to the interactive control element, such as set-top box 22, for play. As each A/V object is played by the interactive control element it is temporarily stored off, preferably in a local storage memory, for easy access in the event that the user of the audio/visual object decides to "grab" it. As previously discussed, there are a variety of storage elements to which audio/visual information may be stored within the interactive cable or satellite television (TV) system 100 of FIG. 1. Temporary, local storage is preferably easily accessible to the interactive control element, which controls the capturing and storing process set in motion when a user indicates that an audio/visual object is to be "grabbed." To this end, it is envisioned that local storage may reside within set-top box 22 if the interactive control element is the set-top box, within television 24 if the set-top box function 22 is encompassed therein, or within a computer having a tuning device and modem that replaces the functionality of the television 24 and set-top box 22, as previously described. Examples of types of temporary local storage may include, but are not limited to, an EEPROM device such as Sony's Memory Stick™, a RAM, a Flash memory, a hard disk of a computer, the network media server, a personal video recorder (PVR), writable DVDs, writable CDs, writable CDRWs, and mini-disks. Each audio/visual object may be stored to its own file within local storage memory. Older files can be thrown away as the available storage becomes full. It is envisioned that the audio/visual object that will usually be selected by the user for grabbing will be the object in play or a very recently played object, although this is not a requirement. It is thus likely, then, that an object selected by the user for capture and permanent storage will be found within temporary, local storage.

At Decision Block 220, the inquiry is whether the user has selected an audio/visual object to be "grabbed," that is, captured and moved from temporary storage to long-term storage where it can be retrieved later at the user's leisure. There are a variety of mechanisms the user can use to indicate a desire to grab a particular audio/visual object, so long as the mechanism represents an unambiguous selection of a particular object. The simplicity with which the select mechanism may be implemented depends in part on the degree flexibility to be given to the user in selecting available audio/visual objects. If the user can only grab the audio/visual object currently in progress or the audio/visual object just immediately played, then the selection mechanism can be quite simplified in implementation. For instance, the selection mechanism may be a single click of a dedicated button(s) or function key(s) on remote control 36, such as a "grab key," or through a simple voice "grab" command. What audio/visual object is selected is determined by when the user activates the selection mechanism. If the user activates the selection mechanism within a predetermined period of time after an immediately preceding audio/visual object has been played, such as during the pause after the preceding object or during the first X seconds of a new object, then this is interpreted as a desire by the user to grab the previous audio/visual object. If, however, the user activates the selection mechanism outside the predetermined period of time after the preceding object has finished playing and during play of the next object, then the user is presumed to wish to grab the currently playing next object. Such a straight-forward approach, while only permitting the user to grab an immediately preceding or currently playing audio/visual object, provides the advantage of each of selection by the user.

If, however, it is desired that the user be able to grab not just the current object or the penultimate audio/visual object, then a more involved user interface, such as a graphical user interface (GUI), displayable on the set-top box or on the display 26 of television 24 may be called for. Using such a GUI, the user may be able to select any audio/visual object played or otherwise available, even if not yet played or if played such a long time ago that it is no longer in temporary storage. Using the remote control 36 or voice activation commands to communicate with such a GUI, the user can select any available audio/visual object to grab. Of course, the chance of not finding the selected audio/visual object in local, temporary storage increases if an older-played object is selected; a selected object not found in temporary storage may have to be obtained from non-local storage, such as via a specific request for that object to the service provider 10 itself.

Continuing with the flow of FIG. 3, if the user has unambiguously indicated, through a selection mechanism, that an audio/visual object is to be grabbed, then the flow continues to Decision Block 230 to determine whether the entire selected audio/visual object has been stored in temporary memory. If the selected object is stored within temporary memory, then the flow continues to Block 260, where the selection is transferred from temporary to long-term memory.

If, however, the entire selected audio/visual object has not yet been stored in temporary memory, this indicates that it is either an in-progress (currently being played) object or that it is not available from temporary local memory for whatever reason and the flow continues to Decision Block 240. Whether an audio/visual object is in-progress can be determined by the set-top box 22 from the start time, duration time, and system time conveyed with the schedule sent by the program listing database 18 over link 20. Based upon the splice points in the TS, EIA/CEA-775.2, for instance, it is possible to determine that the end-point of an in-progress selection has not yet been reached because the end splice point for it has not yet been reached. The schedule gives a rough approximation of timing, while the so-called splice points provided by the TS provide the precise timing points. At Decision Block 240, if the selected audio/visual object is currently being played (in-progress), then the flow continues to Block 250 to continue storing it in temporary memory until it has been stored in its entirety; the flow then continues to Block 260. At Block 260, the fully stored object is transferred from temporary storage to long-term storage memory. Long-term storage memory may be any of the memory storage elements of the system 100 discussed above, including hard disk, CD-ROM, mini-disk, etc., and is distinguished from temporary storage in that it contains those audio/visual objects selected by the user for retention for possible later retrieval at some indefinite future time. Selected audio/visual objects may be stored in any desired manner within the long-term storage element, including as separate files within the long-term storage element or as collections of audio/visual objects related in some way. Collections may include audio/visual objects organized according to music attributes, such as by artist, genre, musicians, album or track titles, etc. Transfer of the object from temporary to long-term storage allows the user to be able to retrieve the object at any future time for viewing or listening, as indicated at Block 280. Buffering means may be needed to be able to retrieve an entire audio/visual object from long-term storage. Such buffering means can be supplied by the set-top box or by other elements of the interactive television system 100.

If, conversely, the selected audio/visual object is determined at Decision Block 240 to not be an in-progress object (in addition to not being stored in its entirety in temporary storage as determined at Decision Block 230), this is indicative that the selected audio/visual object is and will not become available from temporary storage. The selected audio/visual object must be obtained from the content provider (service provider 10) and stored in long-term memory in a long-term storage element of the interactive television system 100, as indicated by Block 270. The selected audio/visual object will then be available for retrieval from long-term storage at some future time when it is requested by the user at Block 280.

It is noted here that in spite of the discussion of transfer of audio/visual objects from temporary to long-term storage by the invention, it is recognized that the invention could use the same storage element for both. Consider, for example, that a hard disk acts as both the temporary and long-term storage element, thereby eliminating the need to transfer the object to long-term storage if it is grabbed. All that would be required would be to make sure that the part of the disk in which the selected audio/visual object in stored is not rewritten; the file corresponding to the selected audio/visual object would be kept around instead of deleting and overwriting it.

The methodology of the present invention may be implemented as executable computer program instructions, embodied in software or firmware, of a computer readable medium that, when executed by a processing system, such as CPU 132 of system 100, cause the processing system to capture and store audio/visual object for later retrieval in response to a request from a user of the system.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for capturing and storing audio/visual objects for later retrieval in response to a request from a user of an interactive multimedia system, comprising:

an interactive control element of the interactive multimedia system receiving a plurality of audio/visual objects for play from a content provider;

storing each audio/visual object of a plurality of audio/visual objects in a temporary storage element of the interactive multimedia system as played by the interactive control element;

in response to the user of the interactive multimedia system activating a selection mechanism of the interactive multimedia system, determining whether the interactive control element has completed storing an audio/visual object of the plurality of audio/visual objects selected by the selection mechanism to the temporary storage element;

if the interactive control element has completed storing the selected audio/visual object to the temporary storage element, transferring the selected audio/visual object from the temporary storage element to a long-term storage element;

if the interactive control element has not completed storing the selected audio/visual object to the temporary storage element, further comprising:

determining whether the interactive control element is causing the selected audio/visual object to be currently played;

if the selected audio/visual object is not being currently played, further comprising:

the interactive control element retrieving the selected audio/visual object from the content provider; and the interactive control element storing the selected audio/visual object in the long-term storage element;

if the selected audio/visual object is being currently played, further comprising:

the interactive control element continuing to store the selected audio/visual object within the temporary storage element until the selected audio/visual object is stored in its entirety; and transferring the audio/visual object from the temporary storage element to the long-term storage element.

2. The method of claim 1, wherein each audio/visual object of the plurality of audio/visual objects has one or more information attributes conveyed from the content provider to the interactive control element.

3. The method of claim 2, wherein the one or more information attributes of each audio/visual object of the plurality of audio/visual objects includes one or more of a schedule attribute, an identifier, an author, a location, a copy and access control information.

4. The method of claim 2, wherein determining whether the interactive control element has completed storing the audio/visual object of the plurality of audio/visual objects selected by the selection mechanism to the temporary storage element is accomplished in accordance with a schedule attribute of the one or more information attributes of the selected audio/visual object.

5. The method of claim 1, wherein each audio/visual object of the plurality of audio/visual objects is one or more of an audio selection, a video selection, an audio video selection, a commercial advertisement, a musical selection, a movie trailer, an event premium, and an electronic commercial transaction.

6. The method of claim 1, wherein the user activating the selection mechanism comprises one or more of the user activating a grab button of an interactive device, the user interfacing with a graphical user interface (GUI) of the interactive multimedia system, and the user activating a voice activation function.

7. The method of claim 6, wherein the interactive device is one of a remote commander, a control panel of a set-top box, and a control panel of a television.

8. The method of claim 1, further comprising:

in response to a request from the user, retrieving the audio/visual object from the long-term storage element and playing the audio/visual object for the user.

9. The method of claim 1, further comprising repeating the method to create a collection of related audio/visual objects wherein each audio/visual object of the collection is related in accordance with one or more shared information attributes.

10. A computer readable medium containing executable instructions which, when executed in a processing system, causes the system to capture and store audio/visual objects for later retrieval in response to a request from a user of the system, comprising:

instructions for an interactive control element of the interactive multimedia system to receive a plurality of audio/visual objects for play from a content provider;

instructions for storing each audio/visual object of a plurality of audio/visual objects in a temporary storage element of the interactive multimedia system as played by the interactive control element;

in response to the user of the interactive multimedia system activating a selection mechanism of the interactive multimedia system, instructions for determining whether the interactive control element has completed storing an audio/visual object of the plurality of audio/visual objects selected by the selection mechanism to the temporary storage element;

if the interactive control element has completed storing the selected audio/visual object to the temporary storage element, instructions for transferring the selected audio/visual object from the temporary storage element to a long-term storage element;

if the interactive control element has not completed storing the selected audio/visual object to the temporary storage element, further comprising:

instructions for determining whether the interactive control element is causing the selected audio/visual object to be currently played;

if the selected audio/visual object is not being currently played, further comprising:

instruction for the interactive control element retrieving the selected audio/visual object from the content provider; and instructions for the interactive control element storing the selected audio/visual object in the long-term storage element;

if the selected audio/visual object is being currently played, further comprising:

instructions for the interactive control element continuing to store the selected audio/visual object within the temporary storage element until the selected audio/visual object is stored in its entirety; and instructions for transferring the audio/visual object from the temporary storage element to the long-term storage element.

11. The computer readable medium of claim 10, wherein each audio/visual object of the plurality of audio/visual objects has one or more information attributes conveyed from the content provider to the interactive control element.

12. The computer readable medium of claim 11, wherein the one or more information attributes of each audio/visual object of the plurality of audio/visual objects includes one or more of a schedule attribute, an identifier, an author, a location, a copy and access control information.

13. The computer readable medium of claim 11, wherein the instructions for determining whether the interactive control element has completed storing the audio/visual object of the plurality of audio/visual objects selected by the selection mechanism to the temporary storage element is accomplished in accordance with a schedule attribute of the one or more information attributes of the selected audio/visual object.

14. The computer readable medium of claim 10, wherein each audio/visual object of the plurality of audio/visual objects is one or more of an audio selection, a video selection, an audio video selection, a commercial advertisement, a musical selection, a movie trailer, an event premium, and an electronic commercial transaction.

15. The computer readable medium of claim 10, further comprising:

in response to a request from the user, instructions for retrieving the audio/visual object from the long-term storage element and playing the audio/visual object for the user.

16. The computer readable medium of claim 10, further comprising:

instructions for repeating the method to create a collection of related audio/visual objects wherein each audio/visual object of the collection is related in accordance with one or more shared information attributes.

17. An interactive multimedia system capable of capturing and storing audio/visual objects for later retrieval in response to a request from a user of the interactive multimedia system, comprising:

an interactive control element operable to control the receipt, play and storage of audio/visual information;

a content provider operable to send a plurality of audio/visual objects to the interactive control element;

a selection mechanism coupled to the interactive control element and under the control of a user of the interactive multimedia system;

a temporary storage element that is controlled by the interactive control element to store each audio/visual object of the plurality of audio/visual objects as each audio/visual object is played;

a long-term storage element;

wherein if, in response to the user activating the selection mechanism to select an audio/visual object of the plurality of audio/visual objects, it is determined that the interactive control element has completed storing the selected audio/visual object to the temporary storage element, the interactive control element transfers the selected audio/visual object from the temporary storage element to the long-term storage element;

wherein if, in response to the user activating the selection mechanism to select an audio/visual object of the plurality of audio/visual objects, it is determined that the interactive control element has not completed storing the selected audio/visual object to the temporary storage element and that the selected audio/visual object is not being currently played, the selected audio/visual object is retrieved from the content provider and stored in the long-term storage element;

wherein if, in response to the user activating the selection mechanism to select an audio/visual object of the plurality of audio/visual objects, it is determined that the interactive control element has not completed storing the selected audio/visual object to the temporary storage element and that the selected audio/visual object is being currently played, the interactive control element continues to store the selected audio/visual object within the temporary storage element until the selected audio/visual object in its entirety is stored and then transfers the selected audio/visual object from the temporary storage element to the long-term storage element.

18. The system of claim 17, wherein the interactive control element is one of a set-top box, a television, and a computer having a tuner device and a modem.

19. The system of claim 17, wherein each audio/visual object of the plurality of audio/visual objects has one or more information attributes conveyed from the content provider to the interactive control element.

20. The system of claim 19, wherein the one or more information attributes of each audio/visual object of the plurality of audio/visual objects includes one or more of a schedule attribute, an identifier, an author, a location, a copy and access control information.

21. The system of claim 19, wherein whether the interactive control element has completed storing the audio/visual object of the plurality of audio/visual objects selected by the selection mechanism to the temporary storage element is determined in accordance with a schedule attribute of the one or more information attributes of the selected audio/visual object.

22. The system of claim 17, wherein each audio/visual object of the plurality of audio/visual objects is one or more of an audio selection, a video selection, an audio video selection, a commercial advertisement, a musical selection, a movie trailer, an event premium, and an electronic commercial transaction.

23. The system of claim 17, wherein the user activates the selection mechanism by performing one or more of activating a grab button of an interactive device, interfacing with a graphical user interface (GUI) of the interactive multimedia system, and activating a voice activation function.

24. The system of claim 17, wherein in response to a request from the user, the interactive control element retrieves the audio/visual object from the long-term storage element and plays the audio/visual object for the user.

25. The system of claim 17, wherein the interactive control element can transfer two or more audio/visual objects of the plurality of audio/visual objects to the long-term storage element to create a collection of related audio/visual objects.

26. The system of claim 25, wherein each audio/visual object of the collection of related audio/visual objects is related in accordance with one or more shared information attributes of the two or more audio/visual objects.

* * * * *

UNITED STATES PATENT AND TRADEMARK OFFICE
CERTIFICATE OF CORRECTION

PATENT NO. : 6,789,106 B2
DATED : September 7, 2004
INVENTOR(S) : Eyer et al.

It is certified that error appears in the above-identified patent and that said Letters Patent is hereby corrected as shown below:

Column 7,
Line 60, change "CD RAN" to -- CD R/W --.

Signed and Sealed this

Sixteenth Day of August, 2005

JON W. DUDAS
*Director of the United States Patent and Trademark Office*